Figure 1:
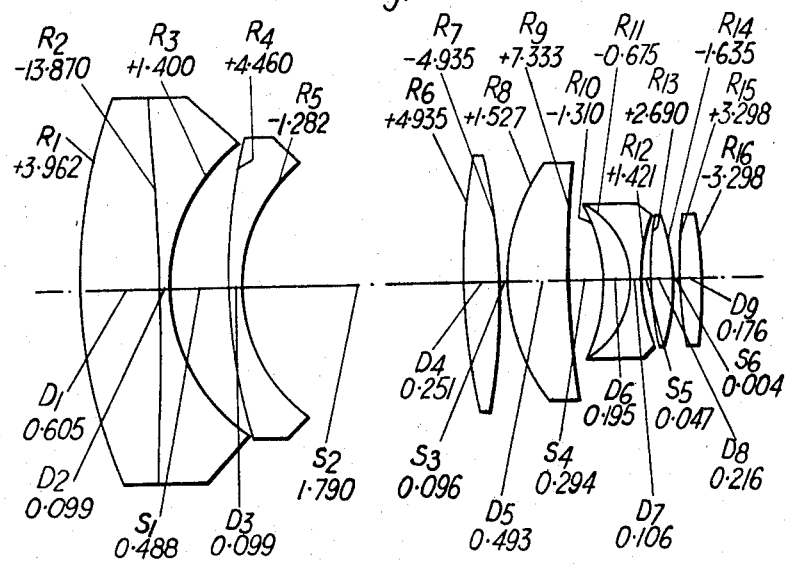

May 8, 1962 P. A. MERIGOLD 3,033,082
INVERTED TELEPHOTO OBJECTIVES
Filed Oct. 12, 1959 2 Sheets-Sheet 1

Inventor
P. A. Merigold
By
Attorneys

United States Patent Office 3,033,082
Patented May 8, 1962

3,033,082
INVERTED TELEPHOTO OBJECTIVES
Peter Arnold Merigold, Leicester, England, assignor to Rank Precision Industries Limited, trading as Taylor, Taylor & Hobson, Leicester, England, a company of Great Britain
Filed Oct. 12, 1959, Ser. No. 845,976
Claims priority, application Great Britain Apr. 13, 1959
10 Claims. (Cl. 88—57)

This invention relates to an optical objective corrected for spherical and chromatic aberrations, coma, astigmatism and field curvature and of the kind often known as an "inverted telephoto" objective, that is one in which the back focal distance is greater than the equivalent focal length of the objective, the objective consisting of a divergent front member widely separated from a convergent rear member. It should be made clear that the terms "front" and "rear" as used herein relate to the sides of the objective respectively nearer to and further from the longer conjugate.

The object of the present invention is to provide an improved inverted telephoto objective wherein good aberration correction is achieved for a wide relative aperture over a wide angular field.

The objective according to the present invention comprises a divergent front member and a convergent rear member widely spaced from such front member, the rear member consisting of five components of which the middle one is divergent and the other four are convergent, the two outer air spaces in such rear member being collective while the two inner air spaces are dispersive, the middle component of the rear member being a biconcave doublet having a collective internal contact surface with radius of curvature lying between 0.4 and 0.65 times the radius of curvature of the front surface of such doublet component while such front surface of such doublet component has a radius of curvature lying between $0.75f_2$ and $1.25\ f_2$, where $f_2$ is the equivalent focal length of the rear member.

Preferably, the radius of curvature of the rear surface of such component lies between 0.45 and 0.575 times the radius of curvature of the front surface of the fourth component of the rear member, such fourth component of the rear member being biconvex and axially separated from the third component by not more than $0.1f_2$.

The sum of the powers of the bounding surfaces of the front outer air space in the rear member preferably lies between $.65/f_2$ and $1.25/f_2$, that of the front inner air space lies between $.65/f_2$ and $1.25/f_2$, that of the rear inner air space lies between $.2/f_2$ and $.6/f_2$, and that of the rear outer air space lies between $.65/f_2$ and $1.25/f_2$.

Preferably, the mean refractive indexes of the materials of the two elements of the middle component of the rear member differ by an amount not less than 0.045, whilst the average value of the Abbé V numbers of such materials lies between 30 and 46.

The convergent fourth and fifth components of the rear member are preferably each biconvex, the equivalent focal length of the fifth component lying between $1.25f_2$ and $2.0f_2$ and the radius of curvature of the rear surface of the fourth component numerically lying between 0.5 and 0.7 times the radius of curvature of the front surface of such fourth component while the average value of the Abbé V numbers of the materials of such fourth and fifth components of the rear member lies between 50 and 60.

The objective in the present case preferably has a back focal length of the order of 1.5 times the equivalent focal length of the objective and in consequence thereof the improved aberration correction achieved is in part concerned with the divergent front member of the objective.

The divergent front member preferably includes a doublet front component having a collective internal contact surface which is concave to the front and has a radius of curvature greater than $4.5f_1$, where $f_1$ is the equivalent focal length of the divergent front member. Preferably, the equivalent focal length ($f_1$) of the divergent front member lies between $1.0f_2$ and $1.7f_2$ and the sum of the differences of the Abbé V numbers of the materials of the two elements of the front doublet of such front member and of the materials of the two elements of the doublet middle component of the rear member lies between 25 and 35. The mean refractive indices of the materials of the two elements of the doublet front component of the front member may conveniently differ by an amount not less than 0.15 and the average value of the Abbé V numbers of such materials lies between 45 and 55.

In a preferred construction of the objective, the front member consists of a meniscus doublet component located in front of a meniscus simple component, all four air-exposed surfaces of such components being convex to the front and the radii of curvature of the front and rear surfaces of the doublet front component lying between $1.25f_1$ and $2.0f_1$ and between $0.475f_1$ and $0.7f_1$ respectively, whilst the rear surface of the simple rear component lies between $0.475f_1$ and $0.7f_1$.

Preferably, the sum of the equivalent powers of the convergent first and second components of the rear member lies between $0.75/f_2$ and $1.15/f_2$, such second component of the rear member being a meniscus simple component having its air-exposed surfaces convex to the front and with the radius of curvature of its rear surface lying between 2.0 and 10.0 times the radius of curvature of its front surface, whilst the front surface of the front component of the rear member is also convex to the front. In the preferred construction of objective, the average value of the Abbé V numbers of the materials of the rear component of the front member and the front component of the rear member lies between 40 and 50. The overall axial length of the rear member preferably lies between $0.85f_2$ and $1.4f_2$.

Figure 2:
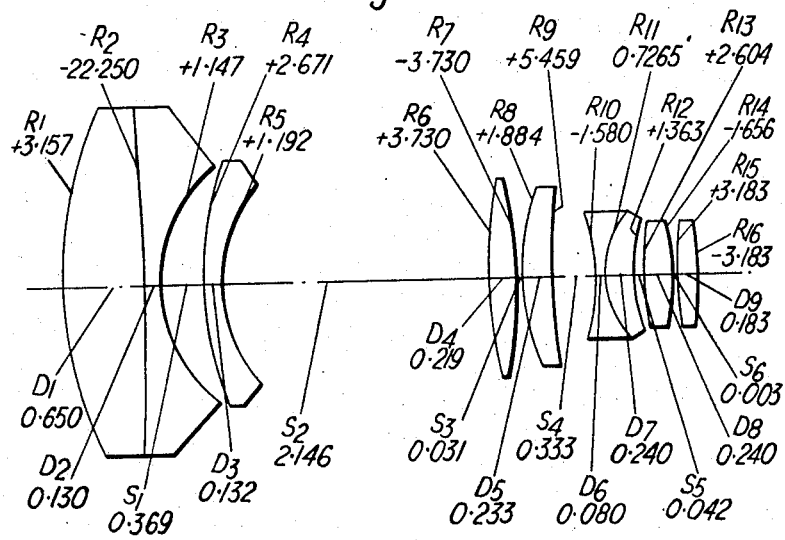
Figure 3:
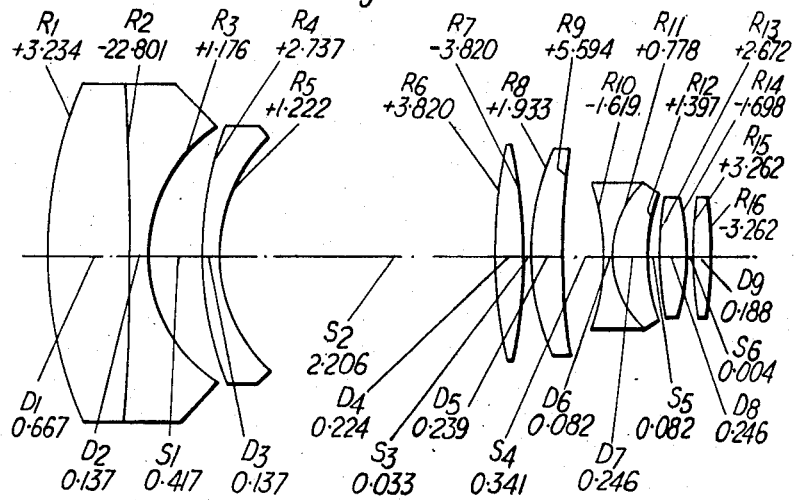
Figure 4:
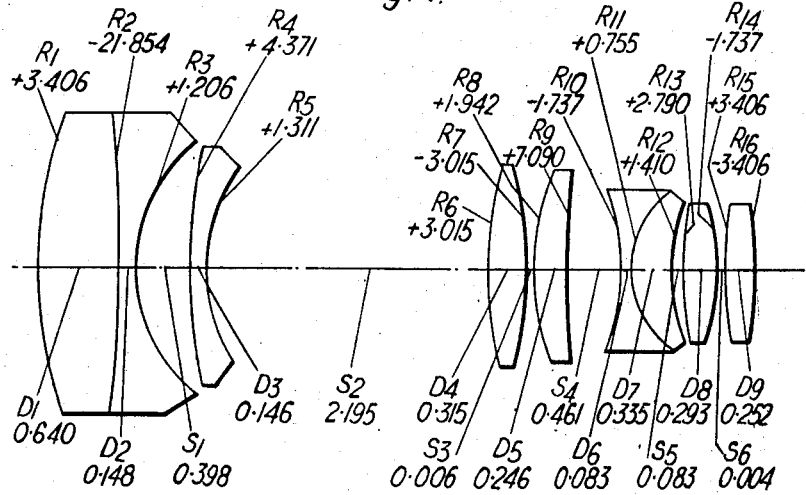

FIGURES 1–4 of the accompanying drawings respectively show four examples of inverted telephoto objective according to the invention and numerical data for such examples are given respectively in the following four tables. In these tables, $R_1$, $R_2$ . . . represent the radii of curvature of the surfaces of the objective, the positive sign indicating that the surface is convex to the front and the negative sign that it is concave thereto, $D_1$, $D_2$ . . . represent the axial thicknesses of the individual elements, and $S_1$, $S_2$ . . . represent the axial air separations between the components. The tables also give the mean refractive indices $n_d$ for the $d$ line and the Abbé V numbers of the materials used for the various elements.

The insertion of equals (=) signs in the radius columns of the tables, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

Example I
[Equivalent focal length (F) 1.000. Relative aperture F/1.75]

| Radius | Thickness or Air Separation | Refractive Index $n_d$ | Abbé V Number |
|---|---|---|---|
| $R_1 = + 3.962$ | | | |
| | $D_1 = 0.605$ | 1.74400 | 44.71 |
| $R_2 = -13.870$ | | | |
| | $D_2 = 0.099$ | 1.50759 | 61.16 |
| $R_3 = + 1.400$ | | | |
| | $S_1 = 0.488$ | | |
| $R_4 = + 4.460$ | | | |
| | $D_3 = 0.099$ | 1.65100 | 58.60 |
| $R_5 = + 1.282$ | | | |
| | $S_2 = 1.790$ | | |
| $R_6 = + 4.935$ | | | |
| | $D_4 = 0.251$ | 1.60545 | 38.03 |
| $R_7 = - 4.935$ | | | |
| | $S_3 = 0.096$ | | |
| $R_8 = + 1.527$ | | | |
| | $D_5 = 0.493$ | 1.65100 | 58.60 |
| $R_9 = + 7.333$ | | | |
| | $S_4 = 0.294$ | | |
| $R_{10} = - 1.310$ | | | |
| | $D_6 = 0.195$ | 1.72000 | 50.31 |
| $R_{11} = - 0.675$ | | | |
| | $D_7 = 0.106$ | 1.64793 | 33.80 |
| $R_{12} = + 1.421$ | | | |
| | $S_5 = 0.047$ | | |
| $R_{13} = + 2.690$ | | | |
| | $D_8 = 0.216$ | 1.69100 | 54.80 |
| $R_{14} = - 1.635$ | | | |
| | $S_6 = 0.004$ | | |
| $R_{15} = + 3.298$ | | | |
| | $D_9 = 0.176$ | 1.69100 | 54.80 |
| $R_{16} = - 3.298$ | | | |

Example II
[Equivalent focal length (F) 1.000. Relative aperture F/1.8]

| Radius | Thickness or Air Separation | Refractive Index $n_d$ | Abbé V Number |
|---|---|---|---|
| $R_1 = + 3.157$ | | | |
| | $D_1 = 0.650$ | 1.74400 | 44.71 |
| $R_2 = -22.250$ | | | |
| | $D_2 = 0.130$ | 1.50759 | 61.16 |
| $R_3 = + 1.147$ | | | |
| | $S_1 = 0.369$ | | |
| $R_4 = + 2.671$ | | | |
| | $D_3 = 0.132$ | 1.69100 | 54.80 |
| $R_5 = + 1.192$ | | | |
| | $S_2 = 2.146$ | | |
| $R_6 = + 3.730$ | | | |
| | $D_4 = 0.219$ | 1.60545 | 38.03 |
| $R_7 = - 3.730$ | | | |
| | $S_3 = 0.031$ | | |
| $R_8 = + 1.884$ | | | |
| | $D_5 = 0.233$ | 1.65100 | 58.60 |
| $R_9 = + 5.459$ | | | |
| | $S_4 = 0.333$ | | |
| $R_{10} = - 1.580$ | | | |
| | $D_6 = 0.080$ | 1.64793 | 33.80 |
| $R_{11} = + 0.7265$ | | | |
| | $D_7 = 0.240$ | 1.72000 | 50.31 |
| $R_{12} = + 1.363$ | | | |
| | $S_5 = 0.042$ | | |
| $R_{13} = + 2.604$ | | | |
| | $D_8 = 0.240$ | 1.65100 | 58.60 |
| $R_{14} = - 1.656$ | | | |
| | $S_6 = 0.003$ | | |
| $R_{15} = + 3.183$ | | | |
| | $D_9 = 0.183$ | 1.65100 | 58.60 |
| $R_{16} = - 3.183$ | | | |

Example III
[Equivalent focal length (F) 1.000. Relative aperture F/1.6]

| Radius | Thickness or Air Separation | Refractive Index $n_d$ | Abbé V Number |
|---|---|---|---|
| $R_1 = + 3.234$ | | | |
| | $D_1 = 0.667$ | 1.74400 | 44.71 |
| $R_2 = -22.801$ | | | |
| | $D_2 = 0.137$ | 1.50759 | 61.16 |
| $R_3 = + 1.176$ | | | |
| | $S_1 = 0.417$ | | |
| $R_4 = + 2.737$ | | | |
| | $D_3 = 0.137$ | 1.69100 | 54.80 |
| $R_5 = + 1.222$ | | | |
| | $S_2 = 2.200$ | | |
| $R_6 = + 3.820$ | | | |
| | $D_4 = 0.224$ | 1.60545 | 38.03 |
| $R_7 = - 3.820$ | | | |
| | $S_3 = 0.033$ | | |
| $R_8 = + 1.933$ | | | |
| | $D_5 = 0.239$ | 1.65100 | 58.60 |
| $R_9 = + 5.594$ | | | |
| | $S_4 = 0.341$ | | |
| $R_{10} = - 1.619$ | | | |
| | $D_6 = 0.082$ | 1.64793 | 33.80 |
| $R_{11} = + 0.778$ | | | |
| | $D_7 = 0.246$ | 1.72000 | 50.31 |
| $R_{12} = + 1.397$ | | | |
| | $S_5 = 0.082$ | | |
| $R_{13} = + 2.672$ | | | |
| | $D_8 = 0.246$ | 1.65100 | 58.60 |
| $R_{14} = - 1.698$ | | | |
| | $S_6 = 0.004$ | | |
| $R_{15} = + 3.262$ | | | |
| | $D_9 = 0.188$ | 1.65100 | 58.60 |
| $R_{16} = - 3.262$ | | | |

Example IV
[Equivalent focal length (F) 1.000. Relative aperture F/1.4]

| Radius | Thickness or Air Separation | Refractive Index $n_d$ | Abbé V Number |
|---|---|---|---|
| $R_1 = + 3.406$ | | | |
| | $D_1 = 0.640$ | 1.74900 | 35.00 |
| $R_2 = -21.854$ | | | |
| | $D_2 = 0.148$ | 1.50970 | 64.44 |
| $R_3 = + 1.206$ | | | |
| | $S_1 = 0.398$ | | |
| $R_4 = + 4.371$ | | | |
| | $D_3 = 0.140$ | 1.70000 | 41.20 |
| $R_5 = + 1.311$ | | | |
| | $S_2 = 2.195$ | | |
| $R_6 = + 3.015$ | | | |
| | $D_4 = 0.315$ | 1.57427 | 52.02 |
| $R_7 = - 3.015$ | | | |
| | $S_3 = 0.006$ | | |
| $R_8 = + 1.942$ | | | |
| | $D_5 = 0.246$ | 1.65100 | 58.60 |
| $R_9 = + 7.090$ | | | |
| | $S_4 = 0.461$ | | |
| $R_{10} = - 1.737$ | | | |
| | $D_6 = 0.083$ | 1.70035 | 30.28 |
| $R_{11} = + 0.755$ | | | |
| | $D_7 = 0.335$ | 1.74900 | 35.00 |
| $R_{12} = + 1.410$ | | | |
| | $S_5 = 0.083$ | | |
| $R_{13} = + 2.790$ | | | |
| | $D_8 = 0.293$ | 1.65100 | 58.60 |
| $R_{14} = - 1.737$ | | | |
| | $S_6 = 0.004$ | | |
| $R_{15} = + 3.406$ | | | |
| | $D_9 = 0.252$ | 1.63945 | 55.70 |
| $R_{16} = - 3.406$ | | | |

In each of these examples the objective is corrected over a wide angular field with respect to a mechanical stop located towards the rear of the rear member. In Example I the objective is corrected over a semi-angular field of 35 degrees with respect to a stop located 0.024F in front of the surface $R_{10}$, in Example II over a semi-angular field of 37½ degrees with respect to stop located 0.020F in front of the surface $R_{10}$, in Example III over a semi-angular field of 40° with respect to a stop located 0.040F in front of the surface $R_{10}$, and in Example IV over a semi-angular field of 34 degrees with respect to a stop located 0.040F in front of the surface $R_{10}$. In Example I the back focal length of the objective is 1.501F, in Example II 1.574F, in Example III 1.605F and in Example IV 1.465F.

The equivalent focal length ($f_1$) of the divergent front member is, in Example I 2.100F, in Example II 2.232F, in Example III 2.281F and in Example IV 1.940F, whilst the equivalent focal length ($f_2$) of the convergent rear member is, in Example I 1.630F, in Example II 1.577F, in Example III 1.691F and in Example IV 1.750F. Thus in Example I, $f_1$ is equal to $1.290f_2$, in Example II $f_1$ is equal to $1.415f_2$ in Example III $f_1$ is equal to $1.350f_2$ and in Example IV $f_1$ is equal to $1.111f_2$.

In each example, the radius of the surface $R_{10}$ is especially of importance in achieving the high degree of correction for coma and for oblique spherical aberration desirable in a wide angle objective. In Example I such radius of curvature is equal to $0.804f_2$, in Example II to $1.002f_2$, in Example III to $0.957f_2$ and in Example IV to $0.992f_2$. The radii of the other surfaces $R_{11}$ and $R_{12}$ of the middle component of the rear member are chosen in relation respectively to the radius of the surface $R_{10}$ and to the radius of the front surface $R_{13}$ of the fourth component of the rear member to assist in the correction of coma, oblique spherical aberration and higher order spherical aberration. In Example I, the radius $R_{11}$ is equal to 0.515 times the radius $R_{10}$ whilst the radius $R_{12}$ is equal to 0.528 times the radius $R_{13}$. In Example II $R_{11}$ is equal to 0.460 $R_{10}$ and $R_{12}$ is equal to 0.523 $R_{13}$, in Example III $R_{11}$ is equal to 0.481 $R_{10}$ and $R_{12}$ is equal to 0.523 $R_{13}$ and in Example IV $R_{11}$ is equal to 0.435 $R_{10}$ and $R_{12}$ is equal to 0.505 $R_{13}$. It will be noticed that in Example I the contact surface $R_{11}$ is concave to the front (see FIGURE 1), whilst in the other three examples such surface $R_{11}$ is convex to the front.

The axial separation $S_5$ of the middle and fourth components of the rear member of $0.029f_2$ in Example I, $0.027f_2$ in Example II, $0.048f_2$ in Example III and $0.047f_2$ in Example IV. The axial length of the rear member is in Example I $1.152f_2$, in Example II $1.017f_2$, in Example III $0.997f_2$ and in Example IV $1.187f_2$.

In the middle component of the rear member, the mean refractive indices of the materials of the two elements thereof differ by 0.072 in Examples I, II, and III and by 0.049 in Example IV, although it will be noticed that in Example I the front element of the component has the higher refractive index.

The equivalent focal length of the fifth component of the rear member is $1.513f_2$ in Example I, $1.569f_2$ in Example II, $1.498f_2$ in Example III and $1.520f_2$ in Example IV, while in Examples I, II, III and IV respectively the radius of the rear surface $R_{14}$ of the fourth component of the rear member is equal to 0.608, 0.636, 0.635, and 0.623 times the radius of the front surface $R_{13}$ of such component.

The Abbé V numbers of the materials of the various elements of the objective are chosen to assist in the correction of chromatic aberrations, those of the elements of the middle component of the rear member being especially important. In such component, the average value of the Abbé V numbers of the materials of the two elements thereof is 42.0 in Examples I, II and III and 32.64 in Example IV. The average value of the Abbé V numbers of the materials of the fourth and fifth components of the rear member is 54.80 in Example I, 58.60 in Examples II and III and 57.15 in Example IV.

The doublet front component of the front member is especially of importance in correcting oblique chromatic aberration, the materials of the two elements thereof having refractive indices differing by 0.236 in Examples I, II and III and by 0.240 in Example IV whilst the average value of the Abbé V numbers of such materials is in Examples I, II and III 52.9 and in Example IV 49.7. The radius of the surface $R_2$ between such two elements is in Example I equal to $6.60f_1$, in Example II to $9.97f_1$, in Example III to $10.00f_1$ and in Example IV to $11.25f_1$. In Examples I, II and III the sum of the differences of the Abbé V numbers of the materials of the two elements of the front doublet component and of the doublet middle component of the rear member is 32.96, whilst in Example IV the sum of such differences is 34.16. The average value of the Abbé V numbers of the materials of the rear component of the front member and of the front component of the rear member is 48.30 in Example I, 46.42 in Examples II and III and 46.61 in Example IV.

In consequence of the location of the stop towards the rear of the objective the radii of the surfaces of the front member are important in the correction of astigmatism and distortion, especially higher order astigmatism and high order distortion. In Example I the radius of the surface $R_1$ is equal to $1.886f_1$ and that of the surface $R_3$ is equal to $0.666f_1$, whilst the radius of the surface $R_5$ is equal to $0.610f_1$. In Example II, the radius $R_1$, is equal to $1.415f_1$, the radius $R_3$ is equal to $0.514f_1$, and the radius $R_5$ is equal to $0.534f_1$. In Example III, the radius $R_1$ is equal to $1.418f_1$ the radius $R_3$ is equal to $0.516f_1$ and the radius $R_5$ is equal to $0.536f_1$ whilst in Example IV the radius $R_1$ is equal to $1.755f_1$, the radius $R_3$ is equal to $0.622f_1$ and the radius $R_5$ is equal to $0.676f_1$. In each example the radius $R_5$ is such as also to assist in the correction of coma and oblique spherical aberration.

In Example I, the sum of the equivalent powers of the front two components of the rear member (i.e. the sum of the terms $$\frac{1}{f_a} \text{ and } \frac{1}{f_b}$$

where $f_a$ and $f_b$ are respectively the equivalent focal lengths of such front two components of the rear member), is $0.942/f_2$, in Example II such sum is $0.841/f_2$, in Example III such sum is $0.898/f_2$ and in Example IV such sum is $1.101f/_2$. The radius $R_9$ is equal to 4.80 times the radius $R_8$ in Example I, to 2.90 times the radius $R_8$ in Example II, to 2.89 times the radius $R_8$ in Example III and to 3.65 times the radius $R_8$ in Example IV.

What I claim as my invention and desire to secure by Letters Patent is:

1. An optical objective of the inverted telephoto type, corrected for spherical and chromatic abberations, coma, astigmatism and field curvature and consisting of a divergent front member and a convergent rear member widely spaced from such front member, the front member including a doublet front component having a collective internal contact surface which is concave to the front and has a radius of curvature numerically greater than $4.5f_1$, where $f_1$ is the equivalent focal length of the front member and lies numerically between $1.0f_2$ and $1.7f_2$, where $f_2$ is the equivalent focal length of the rear member, and the rear member consisting of five components of which the middle one is divergent and the other four are convergent, the two outer air spaces in such rear member being collective whilst the two inner air spaces are dispersive, the middle component of the rear member being a biconcave doublet having a collective internal contact surface with radius of curvature lying numerically between 0.4 and 0.65 times the radius of curvature of the front surface of such doublet component whilst such front surface of such doublet component has a radius of curvature lying numerically between $0.75f_2$ and $1.25f_2$, the overall axial length of the rear member lying between $0.85f_2$ and $1.4f_2$, while the sum of the differences of the Abbé V numbers of the materials of the two elements of the front doublet of the front member and of the materials of the two elements of the doublet middle component of the rear member lies between 25 and 35.

2. An optical objective as claimed in claim 1 in which the sum of the powers of the bounding surfaces of the front outer air space in the rear member lies between $.65/f_2$ and $1.25/f_2$, that of the front inner air space lies between $.65/f_2$ and $1.25/f_2$, that of the rear inner air space lies between $.2/f_2$ and $.6/f_2$, and that of the rear outer air space lies between $.65/f_2$ and $1.25/f_2$, the average value of the Abbé V numbers of the materials of the two elements of the doublet middle component of the rear member lying between 30 and 46, while the mean refractive indices of the materials of the two elements of the doublet front component of the front member differ by an amount not less than 0.15 and the average value of the Abbé V numbers of such materials lies between 45 and 55.

3. An optical objective as claimed in claim 1 in which the divergent front member consists of a meniscus doublet front component and a meniscus simple rear component, all four air-exposed surfaces of such components being convex to the front and the radii of curvature of the front and rear surfaces of the doublet front component lying numerically between $1.25f_1$ and $2.0f_1$ and between $0.475f_1$ and $0.7f_1$ respectively, while the radius of curvature of the rear surface of the simple rear component lies numerically between $0.475f_1$ and $0.7f_1$ where $f_1$ is the equivalent focal length of the front member.

4. An optical objective as claimed in claim 1 in which the radius of curvature of the rear surface of the middle component of the rear member lies numerically between 0.45 and 0.575 times the radius of curvature of the front surface of the fourth component of the rear member, such fourth component of the rear member being biconvex and axially separated from the third component by not more than $0.1f_2$ and the mean refractive indices of the materials of the two elements of the middle component of the rear member differ by an amount not less than 0.045.

5. An optical objective as claimed in claim 1 in which the front member includes a simple rear component and the convergent front component of the rear member is also simple, the average value of the Abbé V numbers of the materials of such components lying between 40 and 50.

6. An optical objective of the inverted telephoto type, corrected for spherical and chromatic aberrations, coma, astigmatism and field curvature, and comprising a divergent front member and a convergent rear member widely spaced from such front member, the numerical values $f_1$ and $f_2$ of the equivalent focal lengths respectively of the front member and of the rear member being such that $f_1$ lies between $1.0f_2$ and $1.7f_2$, the rear member consisting of five components of which the middle one is divergent and the other four are convergent, the two outer air spaces in such rear member being collective while the two inner air spaces therein are dispersive, the middle component of the rear member being a biconcave doublet component having a collective internal contact surface with radius of curvature numerically lying between 0.4 and 0.65 times the radius of curvature of the front surface of such doublet component, such front surface having a radius of curvature numerically lying between $0.75f_2$ and $1.25f_2$, while the radius of curvature of the rear surface of such doublet component lies between 0.45 and 0.575 times the radius of curvature of the front surface of the fourth component of the rear member, such fourth component being biconvex and axially separated from the middle component by not more than $0.1f_2$, the average value of the Abbé V numbers of the materials of the two elements of the doublet middle component of the rear member lying between 30 and 46, while the mean refractive indices of the materials of such two elements differ by an amount not less than 0.045.

7. An optical objective as claimed in claim 6, in which the divergent front member consists of a meniscus doublet front component and a meniscus simple rear component, all four air-exposed surfaces of such components being convex to the front, the radii of curvature of the front and rear surfaces of such doublet front component and of the rear surface of such simple rear component numerically lying respectively between $1.25f_1$ and $2.0f_1$, between $0.475f_1$ and $0.7f_1$ and between $0.475f_1$ and $0.7f_1$, while the convergent front component of the rear member is a simple component, the average value of the Abbé V numbers of the materials of the rear component of the front member and the front component of the rear member lying between 40 and 50.

8. An optical objective as claimed in claim 6, in which the convergent fourth and fifth components of the rear member are each biconvex, the equivalent focal length of the fifth component lying between $1.25f_2$ and $2.0f_2$ and the radius of curvature of the rear surface of the fourth component lying numerically between 0.5 and 0.7 times the radius of curvature of such fourth component, while the sum of the equivalent powers of the convergent first and second components of the rear member lies between $0.75/f_2$ and $1.15/f_2$, such second component being a meniscus simple component with its surfaces convex to the front and with the radius of curvature of its rear surface lying between 2.0 and 10.0 times the radius of curvature of its front surface, while the front surface of the front component of the rear member is also convex to the front.

9. An optical objective as claimed in claim 1, in which the sum of the equivalent powers of the convergent first and second components of the rear member lies between $0.75/f_2$ and $1.15/f_2$, such second component being a meniscus simple component with its surfaces convex to the front and with the radius of curvature of its rear surface lying between 2.0 and 10.0 times the radius of curvature of its front surface, the front surface of the front component of the rear member also being convex to the front, while the convergent fourth and fifth components of the rear member are each biconvex, the equivalent focal length of the fifth component lying between $1.25f_2$ and $2.0f_2$ and the radius of curvature of the rear surface of the fourth component lying numerically between 0.5 and 0.7 times the radius of curvature of the surface of such fourth component, the average value of the Abbé V numbers of the materials of such fourth and fifth components lying between 50 and 60.

10. An optical objective as claimed in claim 6 in which the sum of the powers of the bounding surfaces of the front outer air space in the rear member lies between $.65/f_2$ and $1.25/f_2$, that of the front inner air space lies between $.65/f_2$ and $1.25/f_2$, that of the rear inner air space lies between $.2/f_2$ and $.6/f_2$, and that of the rear outer air space lies between $.65/f_2$ and $1.25/f_2$.

References Cited in the file of this patent

UNITED STATES PATENTS

| | | |
|---|---|---|
| 1,880,394 | Altman | Oct. 4, 1932 |
| 2,536,508 | Lotmar | Jan. 2, 1951 |
| 2,785,603 | Cook | Mar. 19, 1957 |

FOREIGN PATENTS

| | | |
|---|---|---|
| 327,354 | Switzerland | Mar. 15, 1958 |
| 741,511 | Great Britain | Dec. 7, 1955 |